(12) United States Patent
Spillman, Jr. et al.

(10) Patent No.: US 6,690,475 B2
(45) Date of Patent: Feb. 10, 2004

(54) VOLUME MEASUREMENT SYSTEM AND METHOD FOR VOLUME ELEMENT COUNTING

(75) Inventors: William Bert Spillman, Jr., Charlotte, VT (US); Maurizio Massimo, Shelburne, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 0 days.

(21) Appl. No.: 10/315,627

(22) Filed: Dec. 10, 2002

(65) Prior Publication Data

US 2003/0121322 A1 Jul. 3, 2003

Related U.S. Application Data

(62) Division of application No. 09/239,468, filed on Jan. 28, 1999, now Pat. No. 6,516,661.

(51) Int. Cl.$^7$ .............................................. G01B 11/28
(52) U.S. Cl. ........................ 356/627; 382/103; 73/149
(58) Field of Search ................... 356/627; 250/559.21; 73/149, 290 R, 304 C; 340/618, 620, 450.2; 382/103, 100; 702/55

(56) References Cited

U.S. PATENT DOCUMENTS

| | | |
|---|---|---|
| 4,061,417 A | 12/1977 | Katagiri |
| 4,262,531 A | 4/1981 | Hewitt et al. |
| 4,416,514 A | 11/1983 | Plummer |
| 4,418,569 A | 12/1983 | Kühnel |
| 4,479,116 A | 10/1984 | Kobayashi |
| 4,545,020 A | 10/1985 | Brasfield |
| 4,553,216 A | 11/1985 | Stevens et al. |
| 4,739,494 A | 4/1988 | Torii |
| 4,912,646 A | 3/1990 | Cerruti |
| 5,042,299 A | 8/1991 | Wells |
| 5,072,615 A | 12/1991 | Nawrocki |
| 5,180,986 A | 1/1993 | Swartz et al. |
| 5,207,099 A | 5/1993 | Baker |
| 5,225,783 A | 7/1993 | Suzuki et al. |
| 5,386,736 A | 2/1995 | Spillman, Jr. |
| 5,423,214 A | 6/1995 | Lee |
| 5,745,377 A | 4/1998 | Power et al. |
| 5,790,422 A | 8/1998 | Power et al. |
| 5,986,767 A * | 11/1999 | Nakano et al. ............. 356/419 |
| 6,157,894 A | 12/2000 | Hess et al. |
| 6,504,943 B1 * | 1/2003 | Sweatt et al. ............... 382/103 |

FOREIGN PATENT DOCUMENTS

| | | |
|---|---|---|
| EP | 0676624 | 10/1995 |
| GB | 2289542 A | 11/1995 |

* cited by examiner

*Primary Examiner*—Hoa Q. Pham
(74) *Attorney, Agent, or Firm*—Renner, Otto, Boisselle & Sklar, LLP (57) ABSTRACT

A volume measurement system uses volume element counting in determining the amount of a liquid such as fuel in an irregularly-shaped container such as a fuel tank which can have changing orientation. The container is conceptually divided up into a plurality of volume elements. An orientation sensor determines the orientation of the container or of the liquid surface, which is approximated as a plane. A computational or optical processor uses orientation data to project vectors representing the volume elements onto a direction normal to the liquid interface plane. These projected distances are then arithmetically or optically compared to the location of the liquid interface plane.

22 Claims, 3 Drawing Sheets

VOLUME MEASUREMENT SYSTEM AND METHOD FOR VOLUME ELEMENT COUNTING

This is a division of U.S. application Ser. No. 09/239,468, filed Jan. 28, 1999, now U.S. Pat. No. 6,516,661, which is hereby incorporated by reference in its entirety.

TECHNICAL FIELD OF THE INVENTION

The invention herein described relates generally to systems and methods for measuring the volume of a liquid in a container. More specifically, the invention relates to systems and methods for determining the volume of fuel in an irregularly-shaped aircraft fuel tank.

DESCRIPTION OF THE PRIOR ART

The problem of measuring the volume of fuel in an aircraft fuel tank is complicated by two factors. First, such tanks generally have irregular shapes. Second, the orientation of an aircraft fuel tank is not fixed, since the aircraft changes its orientation during flight maneuvers.

Typically, fuel volume in an aircraft fuel tank is determined by use of look-up tables. For a given orientation of the aircraft and a measurement of the fuel level within the tank, a look-up table provides the volume of fuel in the tank. Such look-up tables are laborious to compile, since measurements of the fuel level within the tank must be made for a wide variety of orientations and known fuel volumes. Moreover, use of such look-up tables requires interpolation between the values of the fuel level and of the orientation for which the volume of fuel is known.

In addition, a change of tank design resulting in a change of shape generally requires the entire process of creating a look-up table to be repeated.

From the foregoing, it is clear that there is a need for a method of determining the volume of a liquid such as a fuel within an irregularly-shaped container of varying orientation, which can be accomplished without the expense and time required to generate and use look-up tables.

SUMMARY OF THE INVENTION

A volume measurement system according to the invention uses volume element counting in determining the amount of a liquid such as fuel in an irregularly-shaped container such as a fuel tank which can have changing orientation, as may arise from the fuel tank being located in an aircraft. In a preferred embodiment, the container is conceptually divided up into a plurality of volume elements. An orientation sensor determines the orientation of the container or of the liquid surface, which is approximated as a plane. A computational or optical processor uses orientation data to project vectors representing the volume elements onto a direction normal to the liquid interface plane. These projected distances are then arithmetically or optically compared to the location of the liquid interface plane.

According to one aspect of the invention, a liquid volume measurement system includes an orientation sensor to sense an orientation of a liquid surface within a container; a liquid level sensor to sense a level of the liquid surface; and a processor operatively coupled to the to the orientation sensor for receiving orientation data, and operatively coupled to the liquid level sensor for receiving the level. For each of a plurality of volume elements of the container, the processor compares an indication of a volume element location of the respective element with an indication of a surface location of the liquid surface.

According to another aspect of the invention, a method for measuring liquid volume, includes the steps of conceptually dividing a container into a plurality of volume elements; representing each of the volume elements by an associated point within the respective element, wherein for each of the volume elements there exists an associated vector between a fixed point and the respective associated point; determining a vector normal to a liquid surface within the container; determining a liquid surface distance between the fixed point and the liquid surface in the direction of the normal vector; projecting the associated vectors in the direction of the normal vector to determine a projected distance for each of the volume elements; and comparing each of the projected distances with the liquid surface distance.

According to a further aspect of the invention, a fuel volume measurement system includes an orientation sensor to sense an orientation of a fuel surface within a fuel tank; a fuel level sensor to sense a level of the fuel surface; and a processor operatively coupled to the to the orientation sensor for receiving orientation data, and operatively coupled to the fuel level sensor for receiving the level; a storage device operatively coupled to the processor, the storage device storing location data for each of a plurality of volume elements. For each of the volume elements of the fuel tank, the processor compares an indication of a volume element distance of the respective element along an axis normal to the fuel surface with an indication of a level distance of the surface along the axis, and wherein the processor further counts the volume elements having volume element distances less than the level distance and divides the count by the number of the volume elements.

According to a still further aspect of the invention, a method of determining the dielectric constant of a liquid includes the steps of: determining an orientation of a container containing at least some of the liquid; and calculating the dielectric constant of the liquid using capacitance readings from each of two or more partially-covered capacitance probes in the container, the orientation of the container, location data of the probes, and the operating characteristics of the probes.

According to yet another aspect of the invention, a system for determining the projection of one or more vectors in a direction includes a vector optical element which has one or more areas, each area being an optical analog of at least part of one of the one or more vectors; and a direction optical element optically coupled to the vector optical element, the direction element being an optical analog of the direction.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figures 1, 2:
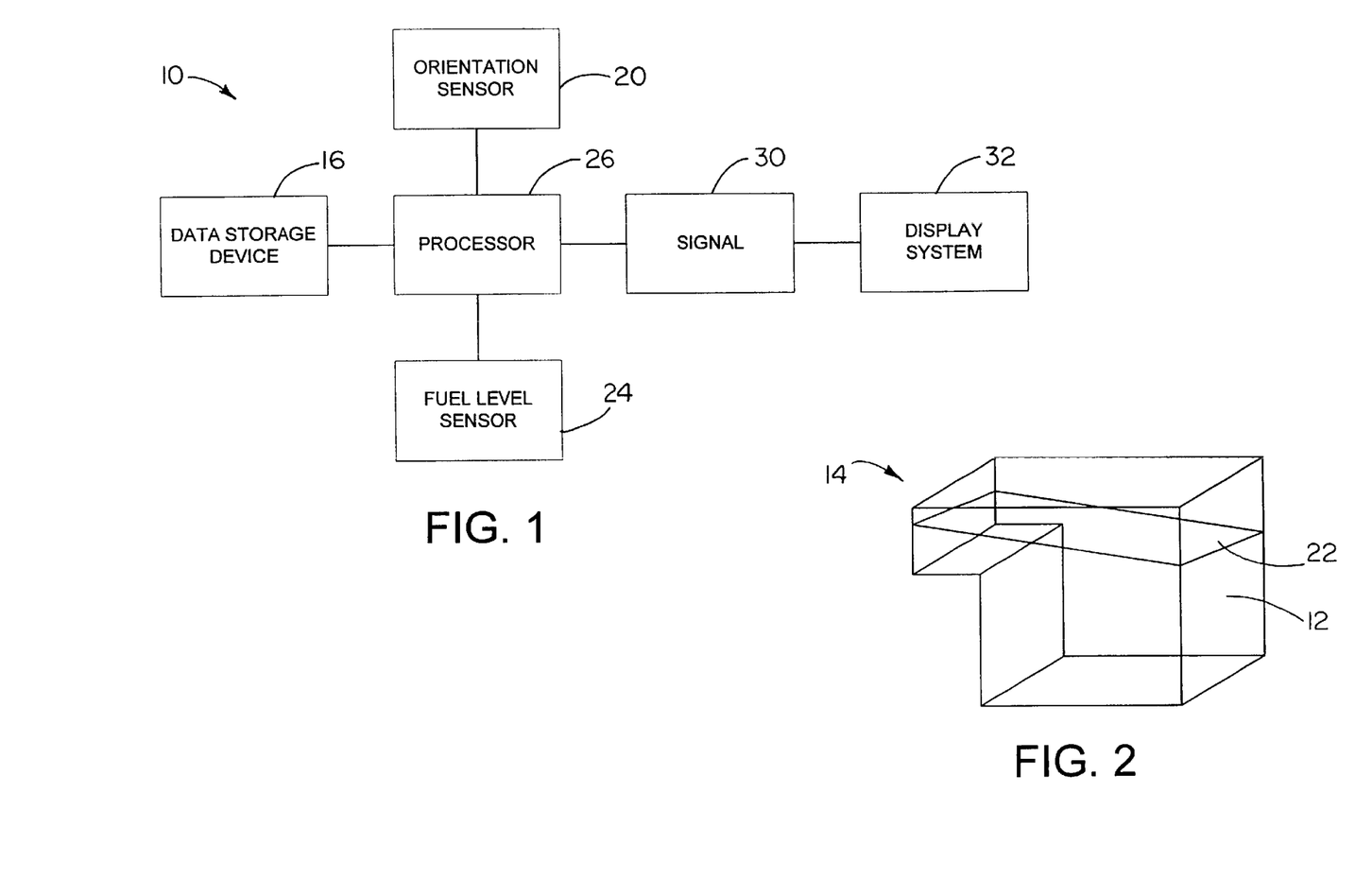
FIG. 1 is a block diagram of a volume measurement system in accordance with the present invention.
FIG. 2 is a perspective diagram of a fuel tank partially filled with fuel.

Referring initially to FIGS. 1 and 2, a volume measurement system 10 is used to measure a volume of liquid, such as a volume of fuel 12, in a tank 14. Briefly, the system 10 includes a storage device 16 for storing location data for volume elements for the tank 14; an orientation sensor 20 to sense orientation of a surface or interface such as a fuel-air interface 22 within the tank 14; and a fuel level sensor 24 to sense a level of the fuel-air interface 22 within the tank 14.

As explained further below, the tank 14 is conceptually divided up into a plurality of volume elements.

A processor 26 receives volume element location data from the storage device 16, orientation data from the orientation sensor 20, and fuel level data from the fuel level sensor 24. The processor 26 projects vectors, representing the location of the volume elements, onto an axis normal to the fuel-air interface 22. The projection of each of the vectors is then compared with the location of the fuel-air interface along that axis. In essence, a coordinate transformation is performed from a Cartesian coordinate system to a coordinate system with one of the axes normal to the fuel-air interface 22, and the other two axes in the plane of the fuel-air interface 22. The number of volume elements below the fuel-air interface is then counted, and the sum is divided by the total number of volume elements to determine the fraction of the volume of the fuel tank 14 that is taken up by the fuel 12.

Using fuel density data, the mass of fuel in the tank can be readily calculated from its volume. The density of the fuel may be determined using one or more densitometers. Such densitometers are well known in the art. As explained in greater detail below, the density of the fuel may determined from its dielectric constant, using a relationship between density and dielectric constant which is known for a given type of fuel.

The processor 26 outputs a signal 30 which contains an indication of the amount of fuel in the tank. This signal 30 may be used by a display system 32 to display information regarding the amount of fuel in the tank 14.

The display 32 may be any of a variety of well-known means for visually displaying quantities. Typical displays such as cathode ray tubes, liquid crystal displays, digital readouts, dials, etc., may be used to display numerical, graphical, pictorial, or other visual indications of the amount of fuel.

It will be appreciated that the output from the processor may alternatively be sent to an aircraft data bus which connects data-gathering devices on an aircraft to a multi-functional pilot display.

A more detailed description of the components and method of the present invention is now given.

Figure 3:
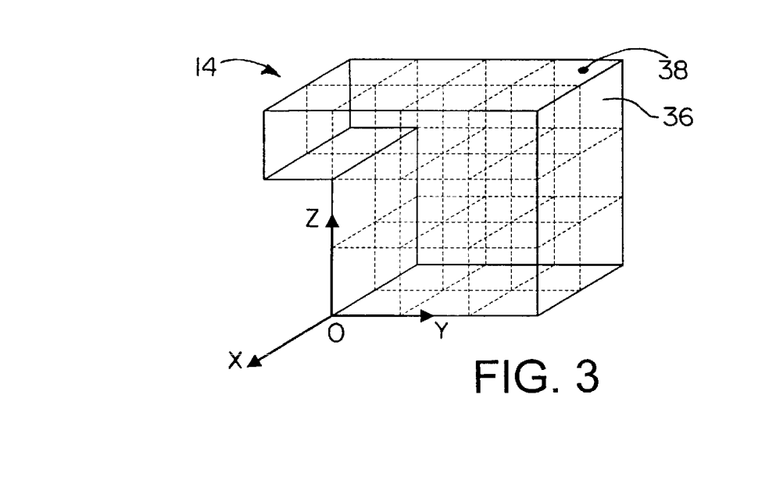
FIG. 3 is a perspective diagram of the fuel tank of FIG. 2 conceptually divided up into volume elements in accordance with the present invention.

Referring to FIG. 3, the tank 14 is conceptually divided up into a plurality $N_o$ of volume elements 36. The tank 14 generally has a complex, irregular shape, although the present invention is not limited to such shapes. Preferably a large number of volume elements and associated points are used. Increasing the number of volume elements increases the accuracy of the resulting measurement.

For example, the tank may be divided into 250 to 500 volume elements. A system with such a number of volume elements has an accuracy of about 1%. It will be appreciated that accuracy may be increased further by using more volume elements.

The volume of the tank 14 is represented by a collection of $N_o$ associated points in an x-y-z coordinate system. A typical associated point 38 is shown in FIG. 3. Each point is associated with a respective volume element and is located in that element. Each point therefore represents a volume of $V/N_o$, where V is the total volume of the tank. It thus represents a fraction of the total tank is volume and the location of that fractional volume in space.

Although the origin O of the Cartesian coordinate system is shown at a corner of the tank 14, it will be appreciated that the origin O of the coordinate system may be located elsewhere, inside or outside the tank. It will be further appreciated that the volume elements may have non-cubic shape, being parallelepipeds or other, more complicated, shapes. Within the tank, some volume elements may differ in shape from other volume elements, for example, to conform to an irregular boundary of the fuel tank. In addition, some volume elements may differ in size from other volume elements, with appropriate modifications made to the method described hereinafter.

Figures 4, 6:
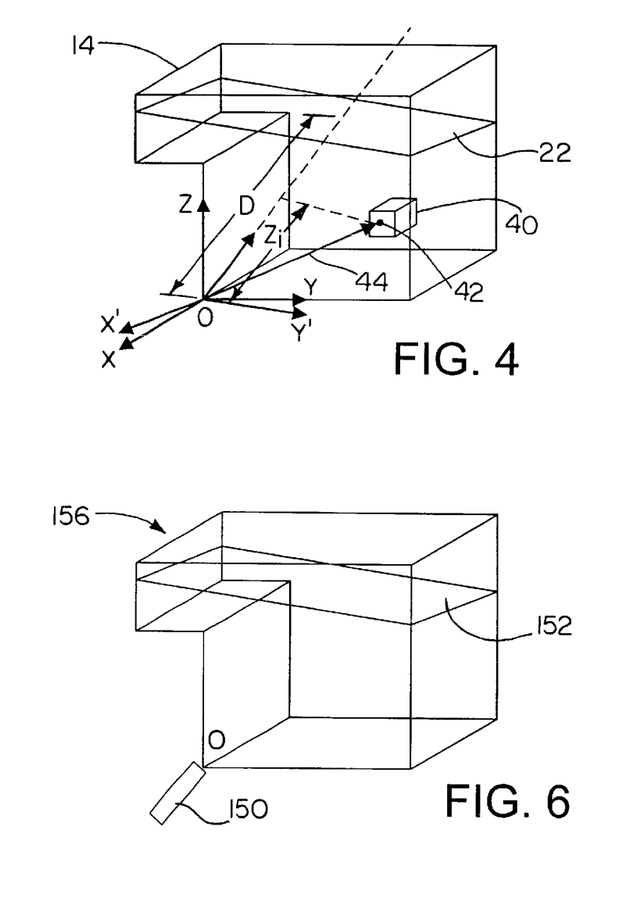
FIG. 4 is a perspective diagram showing projection of a vector onto a line normal to the fuel-air interface plane, in accordance with the present invention.
FIG. 6 shows an alternate embodiment fuel level sensor in accordance with the present invention, an ultrasonic transducer.

Referring to FIG. 4, the fuel-air interface 22 is represented as a plane. This representation is an approximation, as it neglects the effect of the meniscus near the walls of the fuel tank 14, as well as neglecting the effects of ripples, waves, or sloshing at the fuel-air interface 22. However, the approximation of the fuel-air interface 22 as a plane has been found to result in sufficiently accurate measurements. Hereinafter, the fuel-air interface is treated as a plane, and the terms "fuel-air interface" and "interface plane" are used interchangeably in referring to the fuel-air interface and the planar approximation of that interface.

The fuel-air interface 22 may be represented by the standard equation for a plane:

$$Ax+By+Cz=D \qquad (1)$$

where A, B, and C are the x, y, and z components of a unit vector normal to the fuel-air interface 22, and D is the distance from the origin O to the fuel-air interface 22 along a line which is normal to the plane. The relative values of A, B, and C indicate the orientation of the fuel-air interface 22. The unit vector normal to the plane can thus be represented as $Ai+Bj+Ck$, where i, j, and k are unit vectors in the x, y, and z directions, respectively.

An ith volume element 40 has an associated point 42 within the ith element 40 as described above. The Cartesian coordinates of the point 40 are $(x_i, y_i, z_i)$. An associated vector 44 extends from the origin O to the associated point 42.

If the associated point 42 is above the fuel-air interface 22 then the ith volume element 40 is considered to be filled with air. Conversely, if the associated point 42 is below the fuel-air interface 22 (as is shown in FIG. 4) then the ith volume element 40 is considered to be full of fuel.

The problem of determining whether a given associated point is above or below the fuel-air interface 22 is simplified by use of a coordinate transformation. FIG. 4 shows a transformed x'-y'-z' coordinate system. This transformed coordinate system may have, as shown, the same origin O as the x-y-z Cartesian coordinate system described earlier. The x' and y' axes of the transformed coordinate system are parallel to the fuel-air interface 22. The z' axis is in the direction of the unit normal to the plane 22. Thus, $$k'=Ai+Bj+Ck \quad (2)$$

where k' is the unit vector in the z' direction. As mentioned earlier, D is the normal distance between the fuel-air interface 22 and the origin O. Thus, in the transformed coordinate system, the interface plane is located at z'=D. The question of whether the ith associated point 42 is above or below the interface plane is reduced to the question of whether z' is greater than or less than D.

The fraction of the tank 14 that has the fuel 12 in it corresponds to the fraction of the volume elements 36 which have z'<D.

By reducing the problem to one of counting the associated point for which z'<D, it is not necessary to fully transform the coordinates $(x_i, y_i, z_i)$ into the x'-y'-z' coordinate system. All that is required is to determine z' for each of the points associated with the volume elements 36. The values of x' and y' are irrelevant to the analysis.

To determine z' for the ith associated point 42, the vector 44 is projected onto the z' axis. This is done by taking the dot product of the vector 44 and the unit normal to the fuel-air plane 22. The equation for the projection or transformation is a dot product as follows:

$$z_i'=(Ai+Bj+Ck) \cdot (x_i i+y_i j+z_i k) \quad (3)$$

$$z_i'=Ax_i+By_i+Cz_i \quad (4)$$

Therefore, given the locations (x, y, z) of the $N_o$ points associated with the volume elements 36, the components (A, B, C) of the unit normal of the fuel-air interface plane 22, and the distance D from the origin O to the fuel-air interface plane 22 normal to the plane, the fraction of the tank filled with fuel is easily determined by counting the fraction of the associated points for which $z_i'$<D.

The volume of fuel in the tank may be determined by multiplying the fraction of associated points for which $z_i'$<D by the total volume of the fuel tank 14.

It will well be appreciated that the shape of the interior volume of the fuel tank 14 will generally be known from the construction plans of the tank. The locations of the points associated with volume elements of the tank may be determined as described above. The associated points 38 may be randomly located within each of the volume elements 36, as is preferred.

The above method has been described with regard to finding the volume of fuel in a fuel tank containing fuel and air. It will be appreciated that the method and the apparatus for carrying out such method may be used to find the volume of liquid in a tank containing liquid and a gas. Alternatively, with suitable modification, the method may be utilized to find the volume of one liquid in a tank containing two different immiscible liquids. The term "liquids," as used herein, includes colloidal mixtures such as emulsions, foams, and suspensions, as well as other materials whose shape conforms to that of a container therefor and that have relatively fixed volume, i.e., are relatively incompressible.

In addition, it will be appreciated that the above method and associated apparatus are not limited to calculating the volume of liquids in tanks. It is suited as well to determining the volume in other sorts of open or closed containers.

As shown in FIG. 1, the orientation of the fuel-air interface 22 is determined using the orientation sensor 20. The orientation sensor may be a three-axis accelerometer. Such accelerometers provide simultaneous acceleration measurements in three orthogonal directions. Three-axis accelerometers are well-known in the art, utilizing a variety of means to measure acceleration, including mechanical means, magnetic means, inertial means, piezoelectric means, and so forth. Since the inner workings of such accelerometers are well-known, they are not described herein. An exemplary suitable three-axis accelerometer is the Model 34103A accelerometer made by Summit Instruments.

For a three-axis accelerometer with its axes aligned with the axes of the Cartesian coordinate system, the components of the unit vector normal to the fuel-air interface 22 are related to the acceleration measurements as follows:

$$(A, B, C)=(-a_x/a, a_y/a, a_z/a) \quad (5)$$

where $a_x$, $a_y$, and $a_z$ are the respective x-, y-, and z-components of the acceleration, and where a is the total value of the acceleration $(a^2=a_x^2+a_y^2+a_z^2)$.

It will be appreciated that three one-axis accelerometers may be substituted for the three-axis accelerometer described above.

Figure 5:
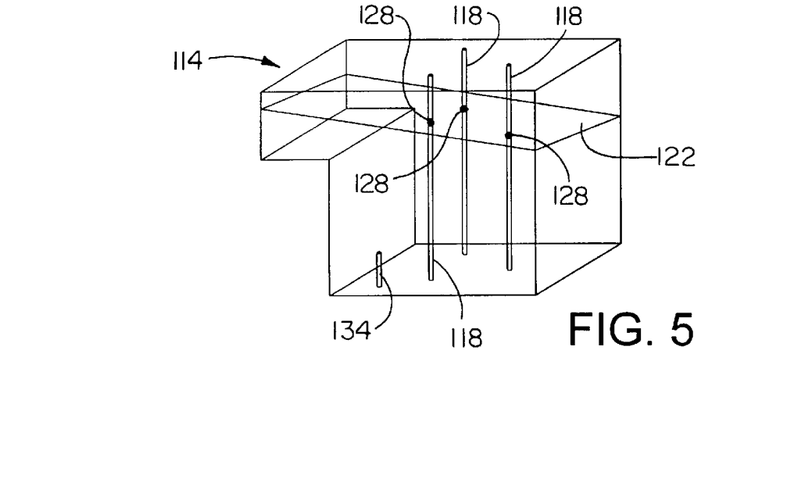
FIG. 5 is a perspective drawing showing probes placed in a fuel tank for use as a fuel level and/or orientation sensors in accordance with the present invention.

Alternatively, the orientation sensor 26 may use fuel level sensors inside the fuel tank to determine the location of a number of points on the fuel-air interface. Such an orientation sensor is shown in FIG. 5, wherein a fuel tank 114 has probes 118 therein. The probes 118 each pass through a fuel-air interface 122 at points 128.

The probes 118 are capacitance height probes. Capacitance height probes are well-known in the art, and typically include a pair of spaced-apart electrodes. For example, the electrodes may be in the form of concentric-spaced tubes. Alternatively, the electrodes may be spaced-apart parallel plates. An exemplary suitable capacitance probe is the 20079-0000-0001 probe made by BFGoodrich.

The dielectric constant of fuel is greater than the dielectric constant of air. Therefore, the capacitance of the probe varies linearly with the amount of the probe that is immersed in fuel. Therefore, measurements of capacitance or impedance of the probe 118 may be made, and the location of the points 128 may be determined, assuming that the location of the endpoints of the probes 118 and the dielectric constant of the fuel are unknown. The dielectric constant of the fuel may be measured independently by a reference probe 134 which is fully immersed in fuel. The reference probe may be located in the fuel tank or elsewhere in the fuel system.

It is well-known that the location and orientation of a plane may be uniquely determined from three points on the plane which are not collinear. Therefore, once the locations of the points 128 are known, the values A, B, C, and D for the plane of the fuel-air interface 122 are easily determined. Thus the probes 118 act as both an orientation sensor and a sensor of the level of the fuel.

It will be appreciated that more than three probes may be utilized to determine the orientation and level of the fuel-air interface. Additional probes may be desirable to allow the orientation of the fuel-air interface to be determined when one or more of the probes are completely covered with fuel and/or are completely uncovered. It will be appreciated that readings from fully covered and fully uncovered probes may readily be excluded from the determination of the orientation of the fuel-air interface plane.

One or more capacitance height probes such as the probes 118 shown in FIG. 5 may be used as a fuel level sensor in conjunction with the accelerometer orientation sensor described above. As shown in FIG. 5, one of the probes 118 is covered by fuel to a height h. Using a coordinate transformation to the x'-y'-z' coordinate system, the distance between the fuel-air interface plane and the origin O may be determined from the height h as follows:

$$D=Ch \qquad (6)$$

This equation is particular to the situation where a capacitance probe has a bottom end at z=0 and where the probe is parallel to the z axis. However, suitable modifications will be appreciated for other orientations and/or locations of the probes.

The capacitance height probes may have a linear response, that is they may have a capacitance reading which varies linearly with the amount of the probe which is covered with fuel.

When two of more linear capacitance height probes are used in conjunction with an orientation sensor such as an accelerometer, the dielectric constant of the fuel may be determined from the readings of the probes, without resort to a reference probe. This is because the height z' of the fuel level in the transformed coordinate system is the same for each of the probes. The vector location $s_i$ of the sense point for a given probe i (the location where the fuel-air interface is on the given probe) is as follows:

$$s_i=(x_{Li}i+y_{Li}j+z_{Li}k)++[(C_i-C_{0i})/C_{ai}(K-1)][(x_{Ui}i+y_{Ui}j+z_{Ui}k)-(x_{Li}i+y_{Li}j+z_{Li}k)] \qquad (7)$$

where $(x_{Ui}i+y_{Ui}j+z_{Ui}k)$ and $(x_{Li}i+y_{Li}j+z_{Li}k)$ are vector locations of the upper and lower points of the probe, respectively; $C_i$ is the measured capacitance of the probe; $C_{0i}$ is the capacitance of the probe when empty; $C_{ai}$ is the active capacitance of the probe, that is, the part of the probe that varies in capacitance as the amount of fuel covering the probe changes; and K is the dielectric constant of the fuel.

The location $z_{si}'$ of this sense point in the transformed coordinate system is the dot product of $s_i$ and the unit normal to the fuel-air interface plane:

$$z_{si}'=(Ai+Bj+Ck) \cdot s_i \qquad (8)$$

$$z_{si}'=(Ax_{Li}+By_{Li}+Cz_{Li})++\{(C_i-C_{0i})/[C_{ai}(K-1)]\}[A(x_{Ui}-x_{Li})+B(y_{Ui}-y_{Li})+C(z_{Ui}-z_{Li})] \qquad (9)$$

The $z_{si}'$ of the sense points of each of the capacitance probes should be the same, since z' is a constant for the fuel-air interface. Therefore the relationship $z_{s1}'=z_{s2}'$ for two capacitance probes may be used to determine the dielectric constant K of the fuel:

$$K=1+\{[A(x_{U1}-x_{L1})+B(y_{U1}-y_{L1})+C(z_{U1}-z_{L1})](C_1-C_{01})/C_{a1}-[A(x_{U2}-x_{L2})+B(y_{U2}-y_{L2})+C(z_{U2}-z_{L2})](C_2-C_{02})/C_{a2}\} \times [A(x_{L2}-x_{L1})+B(y_{L2}-y_{L1})+C(z_{L2}-z_{L1})]^{-1} \qquad (10)$$

Thus with the location and operating characteristics of two of the capacitance probes known, and using the measured capacitance readings from the two probes and the measured orientation, the dielectric constant of the fuel may be determined.

It will be appreciated that the above method for determining dielectric constant of the liquid may also be used for capacitance probes which have a nonlinear but known response, with appropriate modifications to the above equations.

As mentioned above, the density of the fuel may be determined from its dielectric constant, using a relationship between density and dielectric constant which is known for a given type of fuel. An exemplary such relationship is that for grade JP-4 fuel:

$$(K-1)/\rho=0.12192[1+0.3373(K-1)] \qquad (11)$$

where $\rho$ is the density of the fuel in pounds per gallon. It will be appreciated that relationships between dielectric constant and density are known or may be determined for other types of fuel or for other liquids.

Referring to FIG. 6, an alternative fuel level sensor, i.e., an ultrasonic transducer 150, is shown for measuring the level of a fuel-air interface plane 152 in a fuel tank 156. The transducer 150 is preferably a wide angle ultrasonic pulse echo transducer. An exemplary suitable wide angle ultrasonic transducer is the 40145-0101 transducer made by B F Goodrich.

The transducer 150 determines D directly, although it does not determine the direction of the normal between the origin O and the fuel-air interface plane.

It will be appreciated that other types of ultrasonic transducers may be employed, and that more than one such transducer may be utilized.

It will further be appreciated that the ultrasonic transducer may be located other than at the origin O, with suitable modifications being made to account for the difference in location of the ultrasonic transducer. Moreover, the use of an ultrasonic transducer is advantageous because it non-intrusive as compared to a system which uses one or more capacitance probes which must be immersed in the fuel or other liquid in the tank.

Reverting to FIG. 1, location data for the tank volume elements may be stored in the storage device 16. The storage device 16 may be one of a plurality of suitable storage devices, such as a memory chip, a CD-ROM, a computer memory, a magnetic medium such as a floppy disk, a hard disk, or a magnetic tape, or other storage devices suitable for carrying out the invention.

The processor 26 may be a computational device or processor, such as a microprocessor. The microprocessor may be any of a plurality of suitable processors, such as the Pentium II processor made by Intel Corporation, the AMD-K6 processor, or other suitable or compatible processors.

Alternatively, the processor 26 may be or include an optical processor which performs an optical analog for some or all of the computations described above. The optical processor includes a vector optical element which is the optical analog of the vectors corresponding to the volume elements, and a direction optical element which is an optical analog of the direction normal to the fuel-air interface. The vector optical element and the direction optical element are optically coupled.

Colored light may be considered to consist of three component colors, for example, red, blue, and green. The three component colors are combined in various amounts to produce other colors of light. Black is the absence of any of the component colors, while white light is an equal combination of the components.

Components of colored light may be selectively filtered using color filters. Static color filters, which filter a set amount of all or a part of one or more of the color components, are well-known. Also well-known are programmable color filters, which allow the amount of each color component which is filtered-out to be varied independently, based on an input signal or signals. Such programmable color filters may utilize liquid crystal materials between pairs of transparent plates. Examples of liquid-crystal color filters are given in U.S. Pat. No. 4,061,417, issued to Katagiri, and U.S. Pat. No. 4,416,514, issued to Plummer, both of which are herein incorporated by reference in their entireties.

Figure 7:
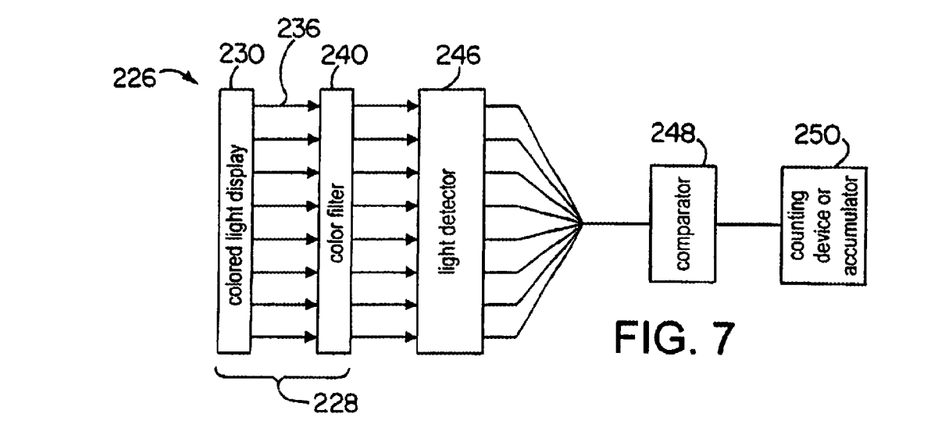
FIG. 7 is a schematic volume of an optical processor in accordance with the present invention.

Referring to FIG. 7, an optical processor 226 is shown. The optical processor 226 has a light-producing section 228. The light-producing section 228 includes a colored light device 230 which is capable of producing different colors of light at each of a plurality of light areas. Exemplary colored light devices are liquid crystal displays, cathode ray tubes, and arrays of light-emitting diodes.

The colored light device 230 is operationally coupled to the storage device 16 (FIG. 1) for storing location data regarding the points associated with the volume elements of the tank. This data is used to control the intensity and color of the light in each of the light areas of the colored light device 230.

Each axis of the Cartesian coordinate system corresponds to a component of colored light. For example, the value of the x coordinate of an associated point may correspond to the amount of red light to be produced from a respective light area of the colored light display 230; the y coordinate may correspond to green; and the z coordinate may correspond to blue. It will be appreciated that the coordinates of the points of the volume elements of the tank may be suitably normalized to correspond to the available intensities producible by the colored light display 230.

Thus the colored light device 230 produces light in $N_o$ light areas, each of the light areas corresponding to one of the $N_o$ volume elements. The amount of each of the color components produced at each of the light areas is related to the location of the respective volume elements.

Colored light 236 emitted from the colored light device 230 then passes through a programmable color filter 240. The programmable colored filter 240 performs an optical analog to the projection of a vector representing the location of a volume element onto the z' axis, the axis normal to the fuel-air interface plane in the transformed coordinate system.

The amount of each of the components of light that passes through the programmable color filter 240 is proportional to the components A, B, and C of the fuel-air interface plane. Thus, continuing the above example, the fraction of red light passing through the programmable color filter 240 may be proportional to A, the amount of green light to B, and the amount of blue light to C. The amount of red light exiting from the programmable color filter 240 for an ith light area corresponding to an ith volume element is proportional to $Ax_i$, where $x_i$ is the x location of the associated point for the ith volume element. The amount of green light exiting from the programmable color filter 240 is proportional to $By_i$. The amount of blue light is proportional to $Cz_i$. The light producing section therefore performs an optical analog of the coordinate transformation dot product described earlier.

The values of A, B, and C are a function only of the orientation of the fuel-air interface plane. They do not vary from volume element to volume element. Therefore, the amount of each of the color components that is absorbed by the programmable color filter 240 is uniform for light from all the light areas.

The amount of filtering for each of the color components will, however, vary over time as the orientation of the fuel tank changes. Therefore, the programmable color filter 240 receives data from the orientation sensor 20. This data may be either directly received or may be processed data. The data from the orientation sensor 20 determines the relative amounts of the color components that are filtered out by the programmable color filter 240.

Light emanating from the programmable color filter 240 then enters a light detector such as a compact color camera (CCD) 246. The image received by the CCD 246 may then be processed using well-known processing technology to determine the total intensity of the color components for each of the light areas. This may be done by determining the intensity directly or by summing the intensities of each of the components for each of the light areas.

A comparator 248 compares the intensity for each of the light areas to a value proportional to and representing the level D of the fuel-air interface plane. It will be appreciated that the comparator may suitably normalize the value of D so that it is properly comparable with the light intensities from the light areas. The number of light areas having intensities less than the suitably-modified D is summed by a counting device or accumulator 250. This sum represents the number of volume elements filled with fuel.

Figure 8:
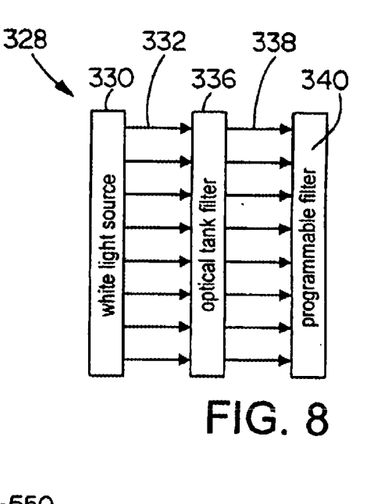
FIG. 8 is a schematic diagram of an alternate embodiment light producing section in accordance with the present invention.

FIG. 8 shows an alternate embodiment light-producing section 328. The light-producing section 328 includes a white light source 330 which produces white light 332. The white light 332 is incident on an optical tank filter 336. The tank filter 336 encodes the tank volume data as absorption areas for components of incident light. Thus, for each light area corresponding to a volume element, the tank filter 336 lets pass a light of each color component that is proportional to a coordinate of the volume element in a Cartesian coordinate system.

The light producing section 328 therefore performs an optical analog of the dot product transformation or projection described earlier.

The tank filter may be made of plastic, with areas for absorbing certain of the colors printed or otherwise applied thereupon.

It will be appreciated that the tank filter 336 functions as a data storage device for data on the location of points associated with volume elements, and dispenses with the need for storing tank volume data elsewhere.

It will further be appreciated that changes in tank design may be accommodated by substituting (or reprogramming) a tank filter corresponding for the new design for the tank filter corresponding to the old design.

Light 338 exiting the tank filter 336 then passes to a programmable filter 340, which is similar in design to the programmable filter 240 described above.

Figure 9:
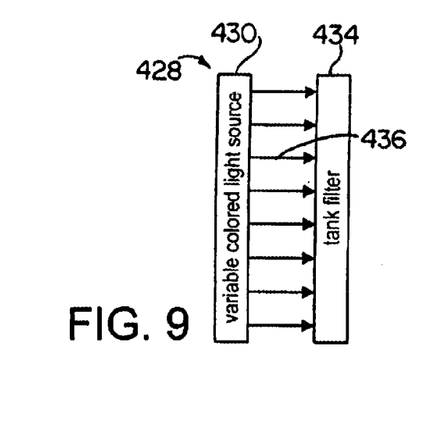
FIG. 9 is a schematic diagram of another alternate embodiment light producing section in accordance with the present invention.

Referring to FIG. 9, another alternate embodiment light-producing system is shown. The light-producing system 428 includes a variable colored light source 430 and a tank filter 434. The colored light source 430 produces colored light 436. The color of the color light 436 varies with the orientation of the fuel-air interface plane. For example, the intensity of the red, green, and blue components of the colored light 436 may be proportional to A, B, and C, respectively.

The colored light source may, for example, include three separate lights, one for each color component. The separate lights would have intensity levels that may be individually adjusted. Other means of producing a variable colored light will be appreciated.

The colored light 436 emanating from the variable colored light source 430 is incident upon the tank filter 434. The tank filter 434 is similar to the tank filter 336 described above. The combination of the colored light 436 and the tank filter 434 performs a similar optical analog to that described earlier regarding the light 338 and the filter 340.

Figure 10:
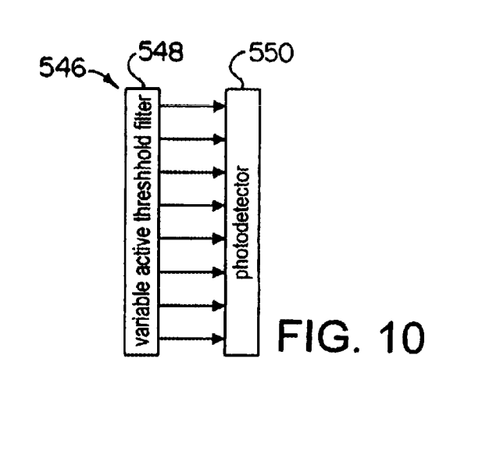
FIG. 10 is a schematic diagram of an alternate embodiment light detector in accordance with the present invention.

Referring to FIG. 10, an alternate embodiment light detector 546 is shown. The light detector 546 includes a variable optical active threshold filter 548 and a photodetector 550.

The active threshold filter 548 is a saturable transmitter, that is it is substantially transparent for incident light below a threshold intensity, and is substantially opaque for light exceeding the threshold intensity. Threshold intensity is variable, and can be selected based on an external signal. Corning PHOTOGREY glass is an exemplary commonly-used saturable transmitter.

The active threshold filter 548 is operatively coupled to the orientation sensor 20. The threshold intensity is set proportional to the distance D for the fuel-air interface plane. This may be done, for example, by rotating the filter to change the length of the optical interaction region within the filter. Thus, light from light areas which has a total intensity which corresponds to a distance less than D passes through the active threshold filter 548. Light areas producing a light with a greater total intensity are completely absorbed at the active threshold filter 548.

Light which passes through the active threshold filter 548 is incident upon a large-area photodetector 550. The number of light signals incident on the photodetector 550 is proportional to the volume of fuel in the tank.

Alternatively, the active threshold filter may be a saturable absorber, that is it may be substantially transparent for light a threshold intensity, and substantially opaque for light below the threshold intensity. In such a case the number of light signals incident on the photodetector would be proportional to the volume of fuel in the tank. Saturable absorbers are well known for use with pulsed lasers and holography. An exemplary saturable absorber is described in M. Duelli et al., "Color doped polymethylmetacrylate used as a holographic recording medium and as an intensity tunable saturable absorber", J. Pure Appl. Optics, Vol. 3, Issue 3, pp. 215–220 (1964), which is incorporated herein by reference in its entirety.

It will be appreciated that an array of photodetectors, each of the detectors corresponding to one or more light areas, may be substituted for the single photodetector shown in FIG. 10.

It will be appreciated that the several embodiments of light-producing systems described above may be coupled with any of the several embodiments of light detectors described above.

The above-described volume measurement system may be employed using the following method:

1. Divide the tank volume into a large number, $N_o$, of small equal volume elements.
2. Represent each of the elements by a point $(x_i, y_i, z_i)$, located at some randomly-chosen position within it. These points define volume element vectors which have their tails at the origin and their heads in the individual volume elements.
3. Calculate the unit vector normal to the fluid plane from the acceleration vector, i.e. $(A, B, C)=(-a_x/a, -a_y/a, -a_z/a)$. The components of the acceleration vector are provided by the acceleration transducer.
4. Calculate the dot product of (A, B, C) and each of the volume element vectors, i.e., $z_i'=Ax_i+By_i+Cz_i$.
5. Count the number N of volume elements with $z_i'<D$, where D is determined either directly using an ultrasonic transducer or indirectly from the amount of a fuel level sensor that is covered with fuel.
6. Calculate the fractional tank volume $V=N/N_o$ that is filled with fuel.

It will be appreciated that the above method is exemplary only, and that many variations and other ways of using the volume measurement system disclosed herein are possible.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A system for determining the projection of one or more vectors in a direction, comprising:
    a light-producing section that includes:
        a vector optical element which has one or more areas, each area being an optical analog of at least part of one of the one or more vectors; and
        a direction optical element optically coupled to the vector optical element, the direction element being an optical analog of the direction; and
    a light detector which detects light output by the light-producing section;
    wherein the light detector is used to determine the projection of the one or more vectors in the direction.

2. The system of claim 1, wherein the direction optical element is programmable, changing optical characteristics in response to an input.

3. The system of claim 2,
    wherein the vector optical element is a vector optical filter which encodes data for the vectors,
    wherein the direction optical element is a programmable optical filter, and
    wherein the light-producing section includes a white light source optically coupled to the filters.

4. The system of claim 2,
    wherein the direction optical element is a programmable colored light, the color of the colored light being a function of the direction, and
    wherein the vector optical element is a vector optical filter which encodes data for the vectors.

5. The system of claim 2,
    wherein the direction optical element is a programmable optical filter,
    wherein the vector optical element is a programmable colored light, and
    wherein the color of the colored light in each of the one or more areas being a function of the respective of the one or more vectors.

6. The system of claim 1, wherein the light detector is a color camera.

7. The system of claim 6, further comprising a comparator which for each of the areas compares a light intensity for light in each of the areas with a predetermined value.

8. The system of claim 1,
wherein the light detector includes a photodetector, and
further comprising a programmable active threshold optical filter which selectively absorbs light from each of the areas based on whether a light intensity of the light exceeds a threshold which is a function of a level distance of a liquid surface along an axis.

9. The system of claim 1, wherein one of the optical elements is an optical filter.

10. The system of claim 9, wherein the optical filter is a programmable color filter.

11. The system of claim 9, wherein the other of the optical elements is another optical filter.

12. The system of claim 9, wherein the other of the optical elements is a colored light source.

13. A system for determining the projection of one or more vectors in a direction, comprising:
a light source;
a light detector; and
a color fitter element that has one or more areas;
wherein the color filter element is between the light source and the light detector;
wherein the light source produces colored light directed toward the color filter element;
wherein the colored light is an optical analog of one of the direction and the one or more vectors;
wherein the color filter element is an optical analog of the other of the direction and the one or more vectors; and
wherein the light detector receives the colored light that passes through the color filtering element, and is used to determine the projection of the one or more vectors in the direction.

14. The system of claim 13, wherein the colored light is an optical analog of the direction.

15. The system of claim 13, wherein the color filter element is an optical analog of the direction.

16. The system of claim 13, wherein color of the colored light is the same for each of the one or more areas of the color filter element.

17. The system of claim 13, wherein color of the colored light is different for different of at least some of the one or more areas of the color filter element.

18. The system of claim 13, wherein the light source includes a color filter that is separate from the color filter element.

19. The system of claim 18, wherein the color filter includes a programmable color filter.

20. The system of claim 13, wherein the color filter element includes a programmable color filter.

21. The system of claim 13, wherein the light detector includes an optical active threshold filter.

22. The system of claim 21, wherein the light detector also includes a photo detector that receives light that passes through the optical active threshold filter.

* * * * *

UNITED STATES PATENT AND TRADEMARK OFFICE
CERTIFICATE OF CORRECTION

PATENT NO.     : 6,690,475 B2
DATED          : February 10, 2004
INVENTOR(S)    : William Bert Spillman, Jr. and Maurizio Massimo It is certified that error appears in the above-identified patent and that said Letters Patent is hereby corrected as shown below:

Column 13,
Line 25, "fitter" should read -- filter --.

Signed and Sealed this

Thirtieth Day of November, 2004

JON W. DUDAS
*Director of the United States Patent and Trademark Office*